US012275039B2

(12) United States Patent
Yeo et al.

(10) Patent No.: US 12,275,039 B2
(45) Date of Patent: Apr. 15, 2025

(54) APPARATUS FOR ADDRESSING WELLS WITHIN A MICROARRAY PLATE

(71) Applicant: Royal Melbourne Institute of Technology, Melbourne (AU)

(72) Inventors: Leslie Yeo, Malvern East (AU); Amgad Rezk, Bayswater (AU); Shwathy Ramesan, Lalor (AU)

(73) Assignee: Royal Melbourne Institute of Technology, Melbourne (AU)

( * ) Notice: Subject to any disclaimer, the term of this patent is extended or adjusted under 35 U.S.C. 154(b) by 0 days.

(21) Appl. No.: 16/771,947

(22) PCT Filed: Dec. 11, 2018

(86) PCT No.: PCT/AU2018/051320
§ 371 (c)(1),
(2) Date: Jun. 11, 2020

(87) PCT Pub. No.: WO2019/113639
PCT Pub. Date: Jun. 20, 2019

(65) Prior Publication Data
US 2020/0391246 A1 Dec. 17, 2020

(30) Foreign Application Priority Data
Dec. 11, 2017 (AU) ................................ 2017904969

(51) Int. Cl.
*B05B 1/06* (2006.01)
*B05B 17/00* (2006.01)
(Continued)

(52) U.S. Cl.
CPC ........ *B06B 1/0629* (2013.01); *B05B 17/0646* (2013.01); *B05B 17/0669* (2013.01)

(58) Field of Classification Search
CPC . B06B 1/0629; B06B 2201/77; B06B 1/0622; B05B 17/0646; B05B 17/0669;
(Continued)

(56) References Cited

U.S. PATENT DOCUMENTS 4,731,204 A * 3/1988 Noma ................ B05B 17/0615 261/81
6,679,436 B1 1/2004 Onishi et al.
(Continued)

FOREIGN PATENT DOCUMENTS

CN 102981090 A 3/2013
CN 103981090 A 8/2014
(Continued)

OTHER PUBLICATIONS

Amgad R. Resk et al., "HYbriD Resonant Acoustics (Hydra)", Advanced Materials, 2016, vol. 28, pp. 1970-1975.
(Continued)

*Primary Examiner* — Qingzhang Zhou
(74) *Attorney, Agent, or Firm* — Westman, Champlin & Koehler, P.A.

(57) ABSTRACT

An apparatus, including at least one piezoelectric chip having a working surface, and an opposing at least substantially parallel transducer surface; and at least one interdigital transducer applied to the transducer surface of the chip for generating acoustic energy within the chip in response to an application of an electrical signal to the interdigital transducer; wherein the working surface of the chip is, when in use, in contact with a fluid receptacle to thereby acoustically actuate fluid accommodated within said fluid receptacle, the chip being directly in contact with the receptacle or in contact with a fluid coupling medium that is in contact with the receptacle.

30 Claims, 6 Drawing Sheets

(51) Int. Cl.
*B05B 17/06* (2006.01)
*B06B 1/06* (2006.01)

(58) Field of Classification Search
CPC ......... B05B 17/0615; B01L 2400/0436; B01L 2400/0439; B01L 2300/0829; B01L 3/0268; G01S 15/88; G01F 23/296
USPC ...................................................... 367/77, 908
See application file for complete search history.

(56) References Cited

U.S. PATENT DOCUMENTS

| | | | | |
|---|---|---|---|---|
| 7,121,275 | B2 * | 10/2006 | Noolandi | B05B 17/0615 239/338 |
| 7,635,094 | B2 * | 12/2009 | Chou | B05B 17/0669 239/533.13 |
| 8,303,778 | B2 * | 11/2012 | Rathgeber | B01F 11/0266 204/157.42 |
| 8,998,483 | B2 | 4/2015 | Friend et al. | |
| 2003/0231225 | A1 | 12/2003 | Shimosako | |
| 2004/0118953 | A1 | 6/2004 | Elrod et al. | |
| 2004/0257906 | A1 | 12/2004 | Scriba et al. | |
| 2007/0152081 | A1 | 7/2007 | Chou et al. | |
| 2008/0156100 | A1 * | 7/2008 | Hines | G01N 29/022 73/584 |
| 2012/0024313 | A1 * | 2/2012 | Rastegar | H01L 21/02041 134/1 |
| 2012/0097752 | A1 | 4/2012 | Okano et al. | |
| 2014/0083174 | A1 | 3/2014 | Reboud et al. | |
| 2017/0128898 | A1 | 5/2017 | Okano et al. | |
| 2017/0178884 | A1 | 6/2017 | Murtazin | |

FOREIGN PATENT DOCUMENTS

| | | | |
|---|---|---|---|
| GB | 2548071 | A | 9/2017 |
| JP | 2004190537 | A | 7/2004 |
| WO | 2005056104 | A | 6/2005 |
| WO | 2010129994 | A1 | 11/2010 |
| WO | 2010150629 | A1 | 12/2010 |
| WO | 2014132228 | A1 | 9/2014 |
| WO | 2014154501 | A1 | 10/2014 |
| WO | 2016179664 | A1 | 11/2016 |
| WO | 2017173478 | A1 | 12/2017 |
| WO | 2018027282 | A1 | 2/2018 |
| WO | 2019079857 | A1 | 5/2019 |

OTHER PUBLICATIONS

International Search Report and Written Opinion issued in corresponding PCT Application PCT/AU2018/051320, dated Feb. 11, 2019.
Kurashina, Y. "Cell Agglomeration in the Wells of a 24-Well Plate Using Acoustic Streaming", Lab on a Chip, 2017, 17, p. 876-886.
Kurosawa M. et al., "Surface acoustic wave atomizer", Sensors and Actuators A, vol. 50, issues 1-2, Aug. 1995 pp. 69-74.
Qi A. et al., "A Miniaturized Surface Acoustic Wave Atomizer with a Disposable Pump-free Liquid Supply System for Continuous Atomization", Proceedings of the 2011 6th IEEE International Conference on Nano/Micro Engineered and Molecular Systems, Kaohsiung, Taiwan, Feb. 20-23, 2011, pp. 295-298.
Yoon S, et al. "Direct and sustained intracellular delivery of exogenous molecules using acoustic-transfection with high frequency ultrasound", Scientific Reports, Feb. 4, 2016, pp. 1-11.
Yoon S. et al. "Acoustic-transfection for genomic manipulation of single-cells using high frequency ultrasound", Scientific Reports, Jul. 13, 2017, pp. 1-11.
Sugimoto, S. et al., "Surface-Acoustic-Wave-Driven Directional Atomizers Integrated With Pico-Liter Micropumps", Journal of Microelectromechanical Systems, vol. 24, Issue 3, Jun. 2015.
European Search Report in corresponding European application No. 18887984.5 dated Jul. 13, 2021.
European Office Action in corresponding European application No. 18887984.5 dated Mar. 14, 2023.

* cited by examiner

APPARATUS FOR ADDRESSING WELLS WITHIN A MICROARRAY PLATE

CROSS-REFERENCE TO RELATED APPLICATION(S)

The present application is a § 371 national phase entry of and claims priority of International patent application Serial No. PCT/AU2018/051320, filed Dec. 11, 2018, and published in English, and further claims priority to Australian Patent Application No. 2017904969, filed Dec. 11, 2017, the contents of which are each hereby incorporated by reference in their entirety.

FIELD OF THE INVENTION

The present invention is generally directed to laboratory apparatus and methods, and in particular to an apparatus and method for acoustic actuation of fluids, particles, cells and other biosamples. While, the present invention will be described with respect to its application in addressing wells within a microarray plate, it is to be appreciated that the invention is not limited to this application, and that other applications are also envisaged.

BACKGROUND OF THE INVENTION

Gene, protein and cell analysis workflows for target identification in drug discovery and development often consist of an arduous series of complex parallel liquid handling protocols, including a combination of sample dispensing, dilution, mixing and/or pre-concentration steps within the wells of a microarray plate, and potentially, the subsequent transfer of the sample out of the wells for further separation and analysis. Conventional liquid handling technologies primarily employ robotically-actuated micropipetting, although the use of pipettes not only poses contamination risks and are limited by the submicrolitre volumes they can handle, but are also prone to error and 'silent' mechanical failures, which can too often be challenging to detect in a timely manner.

Non-invasive or pipette-free technologies such as microfluidics have thus long been regarded as an attractive alternative to the microarray format. Nevertheless, despite considerable advances in microfluidic platforms for genomic and proteomic screening, cell analysis and high throughput combinatorial drug testing in the past decade, the ubiquitous microarray plate remains a stalwart in high through-put drug screening and biochemical analysis. This can partly be due to the aversion of laboratory practitioners to new technology or protocols, which can often be perceived as unnecessarily complex, even if they are more efficient or cost effective. Alternatively, this may simply be due to the compatibility of existing equipment and methods with the array of ancillary technology such as microplate readers and microscopes that are already available in the laboratory, so as to avoid the need to invest in the infrastructure costs and training resources associated with the procurement of new equipment to accommodate new formats and protocols.

As such, there have been parallel efforts to interface non-invasive liquid manipulation methods with microarray technology beyond the array of conventional orbital shaking, magnetic stirring and ultrasonication microplate mixing technologies available, which typically vibrate the entire plate and therefore do not allow individual well addressability. An example, the Echo acoustic handling system sold by LabCyte Inc, San Jose, CA, USA, uses bulk ultrasonic transducers for the transfer of nanolitre sample liquid volumes via acoustic jetting to, from or between the wells. To individually address a well on the microarray plate, the transducer has to be positioned under it using a robotic slider, although this mechanically limits the operation to sequential steps where each well is addressed one at a time. Unless multiple positioners and robotic sliders are employed, which significantly drives up equipment cost, size and complexity, the benefits of parallel handling exemplified by robotic micropipetting cannot be replicated, thereby considerably hampering sample processing times and hence overall throughput. In addition, these acoustic liquid handling systems have been limited to liquid dispensing to date—other sample manipulation modes such as mixing and/or pre-concentration have yet to be demonstrated with this technology, let alone the possibility of actuating a combination of these modes with the same platform.

More recently, surface acoustic wave (SAW) microfluidic technology, which has emerged as an efficient means for driving chipscale particle and droplet manipulation, microchannel actuation, mixing, and particle concentration, having been proposed as a means for directly interfacing the microarray plate. Nevertheless, individual well or simultaneous multiwall addressability on demand is still not possible using this technique, which is employed by the PlateBooster system of Advalytix AG, Munich, Germany, since all of the wells directly in the path of the SAW transmission are excited by the acoustic wave. For this reason, it was proposed that individual SAW chips (single crystal 128° Y-X lithium niobate) be interfaced beneath each well. This practice is however constrained by the necessity of interdigital transducer (IDT) electrodes on the top face of the chip to generate the SAW. Given that IDTs occupy considerable space on the chip to the extent that they interfere with neighbouring wells, even for the larger 24-well plate format, this physical constraint jeopardises the addressability of all individual wells in the entire microarray plate.

Eliminating the use of IDTs by employing a plate electrode to drive bulk acoustic waves on individual piezoelectric discs directly beneath each well has also been proposed in 'Y. Kurashina, K. Takemura and J. Friend, Lab on a Chip, 2017, 17, 876 886'. However, the need for electrical connections on the top and bottom faces of the discs under each well imposes considerable difficulties in wiring each individual disc. In fact, a single wire connecting multiple discs was instead depicted in FIG. 1 of the Kurashina et al. paper. This would have led to activation of the entire row of wells above the discs connected by the same lead, resulting in the same limitation as the previously described PlateBooster system. As such, while proof-of-concept of actuating the liquid in a single well was shown, the possibility of individually addressing all of the wells on the microarray plate was never demonstrated, let alone on industry-standard 96- and 384-well plate formats. Additionally, it is necessary for the piezoelectric transducer in that research paper to be mounted at an inclination angle with respect to the well plate, which not only complicates the setup, manufacture and assembly of the platform but also limits accessibility to the rest of the wells for individual addressability.

The above discussion of background art is included to explain the context of the present invention. It is not to be taken as an admission that the background art was known or part of the common general knowledge at the priority date of any one of the claims of the specification.

It is therefore desired to provide an apparatus that addresses one or more of the issues associated with the prior art.

SUMMARY OF THE INVENTION

According to one aspect of the present invention, there is provided an apparatus, including:

a plurality of piezoelectric chips, each chip having a working surface, and an opposing transducer surface at least substantially parallel to the working surface; and at least one interdigital transducer applied to the transducer surface of each chip for generating acoustic energy within each chip in response to an application of an electrical signal to the interdigital transducer;

wherein the working surface of each chip is, when in use, in direct or indirect contact with a fluid receptacle to thereby respectively acoustically actuate fluid accommodated within said fluid receptacle, each chip being directly in contact with the receptacle or in contact with a fluid coupling medium that is in contact with the receptacle.

According to another aspect of the present invention, there is provided an apparatus, including:

a plurality of piezoelectric chips, each chip having a working surface, and an opposing transducer surface at least substantially parallel to the working surface; and at least one interdigital transducer applied to the transducer surface of each chip for generating acoustic energy within the chip in response to an application of an electrical signal to the interdigital transducer;

wherein the working surface of each chip is, when in use, in direct contact with a fluid droplet to be acoustically actuated.

According to a further aspect of the present invention, there is provided an apparatus, including:

at least one piezoelectric chip having a working surface, and an opposing at least substantially parallel transducer surface; and at least one interdigital transducer applied to the transducer surface of the chip for generating acoustic energy within the chip in response to an application of an electrical signal to the interdigital transducer;

wherein the working surface of the chip is, when in use, in direct or indirect contact with the receptacle to thereby actuate fluid accommodated within said fluid receptacle, the chip being directly in contact with the receptacle or in contact with a fluid coupling medium that is in contact with the receptacle.

The fluid coupling medium may be an acoustic fluid, gel or tape couplant such as, but not limited to, a thin layer of water or silicone oil.

The apparatus may preferably include a plurality of said chips, each said chip respectively acoustically actuating fluid in said fluid receptacle. The fluid receptacle may be a microarray plate including a plurality of wells for respectively accommodating fluid therein. The chips may be dimensioned to facilitate acoustic actuation of fluid within a single said well. The chips may be located in a grid pattern to match the position of individual said wells in the microarray plate. The or each chip may be supported on a circuit board having a conductive circuit layout for providing a said electrical signal to the interdigital electrode of the or each chip.

The generated acoustic energy may include surface reflected bulk waves (SRBW). The acoustic energy may also include surface acoustic waves and/or bulk acoustic waves. The acoustic actuation of the fluid may include any one or more of manipulation, vibration, mixing, pre-concentration, jetting, nebulisation, particle/cell patterning, centrifugation, fluid or particle or cell transport, drop transport, streaming, and atomisation.

According to another aspect of the present invention, there is provided a method of acoustically actuating fluid accommodated within a fluid receptacle using an apparatus as described above.

According to a further aspect of the present invention, there is provided a method of acoustically actuating fluid accommodated within one or more wells of a microarray plate including:

providing a plurality of piezoelectric chips, each chip having a working surface, and an opposing at least substantially parallel transducer surface; and at least one interdigital transducer applied to the transducer surface of each chip for generating acoustic energy within the chip in response to an application of an electrical signal to the interdigital transducer;

wherein the working surface of each chip is, in use, in contact with said microarray plate or an intervening fluid coupling medium beneath the microarray plate The chips may be dimensioned to facilitate acoustic actuation of fluid within a single said well. The chips may be located in a grid pattern to match the position of individual said wells in the microarray plate. Each chip may be supported on a circuit board having a conductive circuit layout for providing a said electrical signal to the interdigital electrode of each chip.

The generated acoustic energy may include surface referred bulk waves (SRBW). The acoustic energy may also include surface acoustic waves and/or bulk acoustic waves. The acoustic actuation of the fluid may include any one or more of manipulation, vibration, mixing, pre-concentration, jetting, nebulisation, particle/cell patterning, centrifugation, fluid or particle or cell transport, drop transport, streaming, and atomisation.

The present summary is provided only by way of example, and not limitation. Other aspects of the present invention will be appreciated in view of the entirety of the present disclosure, including the entire text, claims and accompanying figures.

BRIEF DESCRIPTION OF THE DRAWINGS

It will be convenient to further describe the invention with reference to the accompanying drawings which illustrate a preferred embodiment of the apparatus according to the present invention. Other embodiments are possible, and consequently, the particularity of the accompanying drawings is not to be understood as superseding the generality of the preceding description of the invention.

In the drawings:

FIG. 1(*b*) respectively shows schematic side and top views of an apparatus according to the present invention which enables individual wells to be addressed in the absence of cross-talk;

FIG. 1(*c*) is an photographic image showing a top view of a partially assembled apparatus according to the present invention;

FIG. 2(*b*) are photographic images respectively showing further different top views of the apparatus of the present invention;

FIG. 3(*b*) are photographic images respectively showing sequential mixing within wells of a 96-well microarray plate driven using the apparatus according to the present invention;

FIG. 3(*c*) is a graph showing the normalised mixing index in three different wells of a microarray plate over time using an apparatus according to the present invention;

Figure 1:
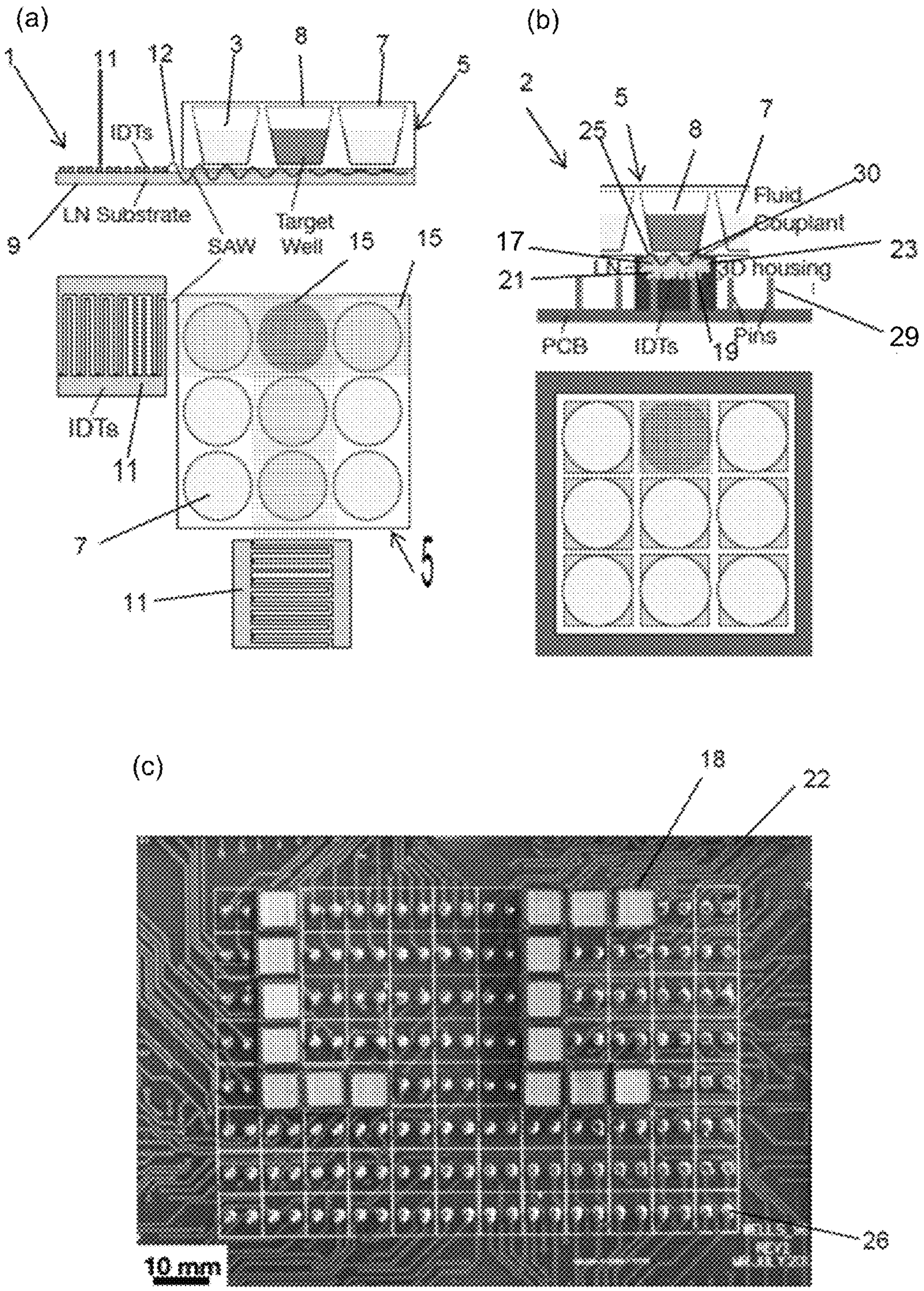
FIG. 1(*a*) respectively shows schematic side and top views of a commercial prior art apparatus which fails to address individual wells.

While the above-identified figures set forth one or more embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION OF THE INVENTION

Referring initially to FIG. 1(*a*), there is shown a prior art apparatus 1 for addressing wells 7 of a microarray plate 5. That apparatus 1 utilises a piezoelectric substrate 9, typically made from Lithium Niobate (LN). That substrate 9 has a transducer surface 12, upon which are applied two inter-digital transducers (IDT) 11. Application of an electric signal to each IDT 11 results in surface acoustic waves (SAW) 15 being generated along the transducer surface 12. The microarray plate 5 is located in contact with the transducer surface 12 so that fluid 3 held within the wells 7 can be acoustically actuated by the SAW 15.

FIG. 1(*b*) shows an apparatus 2 according to the present invention for addressing wells 7 of a microarray plate 5. The apparatus 2 includes a plurality of piezoelectric chips 17, for example made from LN, that are respectively dimensioned to address a single well 7 of the microarray plate 5. Each chip 17 has a bottom transducer surface 19 upon which is applied an IDT 21, and an opposing top working surface 23. The transducer surface 19 is at least substantially parallel to the working surface 23. The piezoelectric chips 17 are supported on a printed circuit board PCB) 22 vic pins 29 which supports the chip modules 17 in a grid pattern matching the positions of the wells 7 of a standard microarray plate 5. The PCB 22 includes a conductive circuit layout for enabling an electrical signal to be applied to each IDT 21. The microarray plate 5 is in contact with the top working surfaces 23 of each chip 17. Alternatively, the microarray plate 5 is in contact with the top working surfaces 23 of each chip 17 through a coupling layer 30. The fluid coupling medium is an acoustic fluid, gel or tape couplant such as, but not limited to, a thin layer of water or silicone oil.

Application of an electrical signal to each IDT 21 results in acoustic energy being generated within each chip 17. The acoustic energy is primarily in the form of surface reflected bulk waves (SRBW) 25 which propagate though the chip 17 to the working surface 23. The Applicant's International publication no. WO2016/179664 describes in more detail how a SRBW is generated. It is in particular noted that SRBW is generated as a result of SAW being propagated along the transducer surface 19 of each chip 17. This in turn generates SRBW 25 that is reflected between the transducer and working surfaces 19, 21 of each chip 17. The generation of SRBW is optimised by having the thickness of each chip 17 at or around the wavelength of the SAW propagated in the transducer surface 19. The acoustic energy generated within the chip 17 can have a hybrid wave configuration due to the combining of the SFBW with the SAW and any other bulk acoustic waves generated within the chip 17. In some embodiments, the chip thickness is matched to the wavelength, set by the width and gap of the IDT patterns, which, in turn, specifies the resonant frequency at which the IDT is excited. In one embodiment, the chip thickness h≈500 μm and the resonate frequency at which the IDT is excited is 10 MHz.

The apparatus 2 according to the present invention provides a modular and reconfigurable platform that utilises individual chips 17 whose dimensions completely match the well dimensions, so that each well 7 can be directly and individually, or even simultaneously, addressed on demand without incurring crosstalk of the signal with neighbouring wells.

FIGS. 1(*a*) and (*b*) respectively depicts two different principles by which (a) SAWs, and, (b) SRBWs in the present invention, can be coupled from a piezoelectric lithium niobate (LN) substrate 9, 17 to individually address a target well 8 (shown in red) in a microarray plate. FIG. 1(*a*) shows a commercially available system similar to the Advalytix PlateBooster system, where liquid manipulation in the target well 8 can be driven by exciting two orthogonal SAWs 15 with the aid of a pair of IDTs 11 whose transmission paths intersect beneath the well 8. In this commercial system however, it can be clearly seen that addressability of a single well is not possible since entire rows of wells 7, 8 in the transmission pathway of the SAWs 15 are also concurrently excited. Conversely, in the apparatus 2 in accordance with the present invention, as shown in FIG. 1(*b*), addressability of a single target well 7, 8 is achieved by mounting standalone LN chips 17 beneath each well 7, 8 that have IDTs 19 on their underside which are electrically connected by plugging the chip modules 18 supporting each chip 17 onto the PCB 22 as shown in FIG. 1(*c*). The SRBW 25 that is generated on the underside transducer surface 19 of the chip 17 where the IDTs 21 are patterned propagate through the thickness of the chip 17 to the top working surface 23 where they are transmitted into the wells 7, 8. Not only can each well or multiple wells be addressed in this manner sequentially or simultaneously, the modules can also be arbitrarily arranged to flexibly support any desired well or microarray plate configuration, as shown in FIG. 1(*c*). It is further envisaged that other embodiments, without a fluid receptacle, may be configured to provide addressability of a single droplet, as detailed in FIG. 7.

Figure 2:
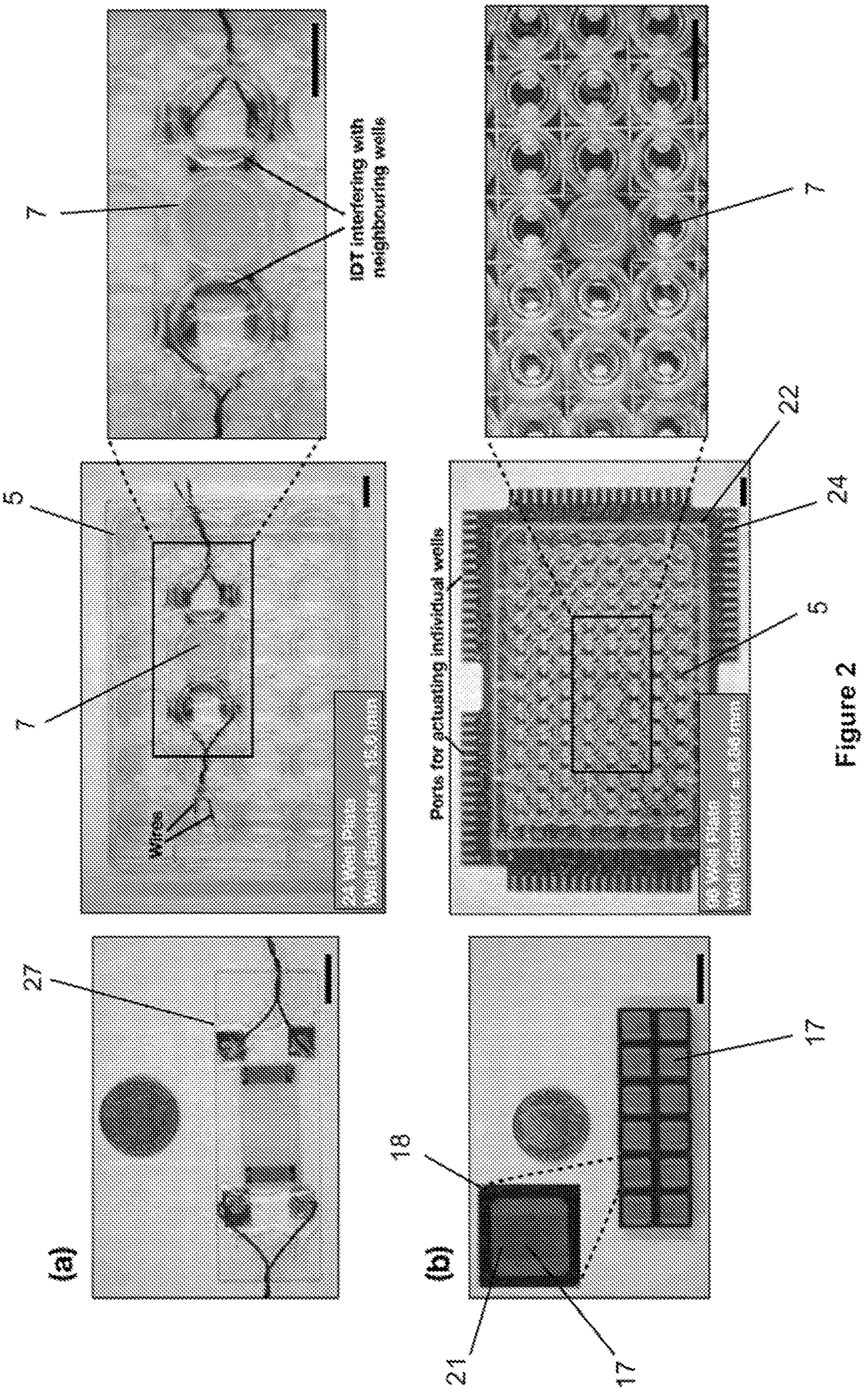
FIG. 2(*a*) are photographic images respectively showing different top views of a prior art SAW apparatus.

FIG. 2 (*a*) show top view images of a SAW device 27 (left) interfacing with a well 7 in a 24-well microarray plate 5 (centre). The magnified view on the right clearly shows the interference of the acoustic wave generated by the IDTs with neighbouring wells, thus highlighting the inability of the device to provide individual addressability of all the wells on the plate, and the limitation encountered when attempting further size reduction beyond the 24-well plate format. FIG. 2(*b*) shows top view images of the much smaller chip modules 18, each accommodating a chip 17 (left). The modules 18 are imaged flipped to show the IDTs 21 on the underside of the chip 17. Each of the modules 18 can be mounted beneath every single well 7 on a 96-well plate 5 (centre) and electrically connected to a PCB 22 from beneath (for clarity, only one module 18 has been plugged into the PCB 22). The magnified view on the right shows the possibility for individual addressability of each well 7 or even simultaneous addressability of multiple wells 7 on demand since the chips 17 are not only matched in dimension so that they only transmit acoustic energy into the well that is directly above them, but are also isolated from neighbouring chips 17 by a 3D printed housing that encases them to form the chip module 18. The scale bars denote a length of 10 mm.

The miniaturisation of the chip dimensions without loss in efficiency is therefore made possible by patterning the IDTs 21 on the underside of the chip 17 and employing SRBWs generated within the chip 17, where the chip thickness (h≈500 μm) is matched to the wavelength, set by the width and gap of the IDT patterns. This in turn specifies the resonant frequency—here at, 10 MHz—at which the IDT 21 is excited. Unlike SAWs, which are only generated and propagate on the bottom transducer surface 19 of the chip 17 on which the IDTs 21 are patterned, these hybrid surface and bulk waves are generated on the IDTs 21 but propagate through the thickness of the chip 17 to the top working surface 23, where they interface with and are transmitted into each well 7 (FIG. 1(*b*)). In this way, it is possible to reduce the chip dimensions to that comparable with the IDT dimensions since no additional surface area for the transmission of the acoustic wave is required on the transducer surface 19. This then allows the dimensions to be exactly matched to, for example, a 96-well plate as shown in FIG. 2(*b*). It is also envisaged that the chip dimensions can be further scaled down to accommodate the additional wells in a 384-well plate given that the IDT dimensions are fundamentally limited only by the acoustic wavelength. In still other embodiments, it is envisaged that droplets may be placed directly onto a piezoelectric chip, in the absence of any fluid receptacle, allowing direct interaction between the acoustic waves and the droplets, as further outlined in FIGS. 6 and 7.

Moreover, the placement of the IDTs 21 on the underside surface 19 allows circumvention of the limited space available for electrical connections that have plagued preceding technologies. This is because it is possible to directly access the IDTs 21 from below by snap fitting each chip 17, mounted in a 3D printed housing 10, onto each of the 96 protruding connection pin pairs 26 soldered on the custom-designed printed circuit board (PCB) platform 22 shown in FIG. 1(*c*). Traces for the electrical excitation of each individual well 7 are linked to edge connectors 24 at the periphery of the PCB 22 (FIG. 2(*b*)). These can then be manually or digitally triggered by switches controlled by an Arduino board. Further, the modular nature of the present invention allows flexible reconfiguration of the apparatus to accommodate widely different formats beyond the standard microarray plate, as exemplified in FIG. 1(*c*).

Figure 3:
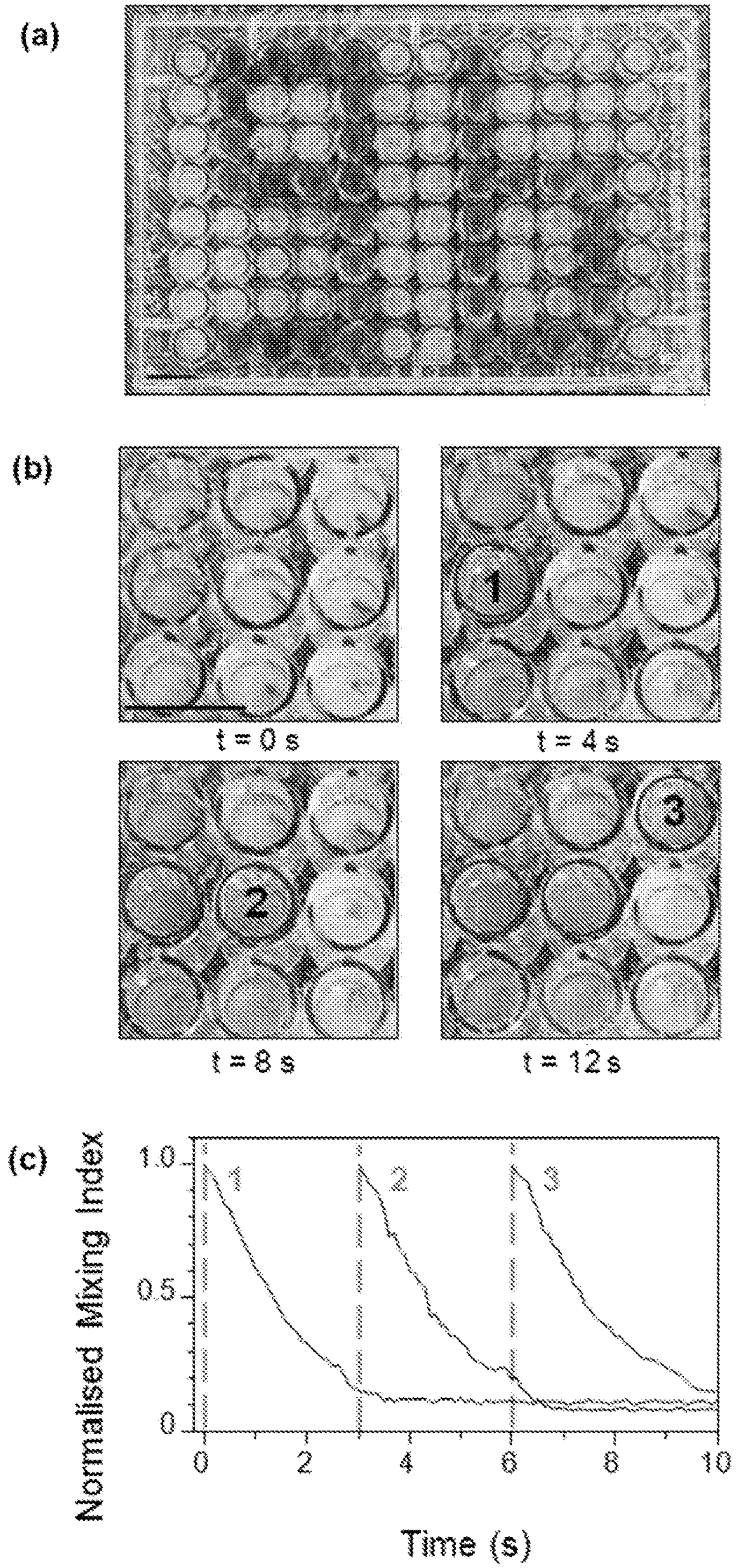
FIG. 3(*a*) is a photographic image showing simultaneous mixing within wells of a 96-well microarray plate driven using the apparatus according to the present invention.

The present invention has the capability for on-demand addressability of individual wells to carry out a number of typical liquid handling processes required in the microarray workflow, such as sequential mixing, particle/cell concentration, and single droplet ejection from single or multiple wells via liquid jetting—such a capacity to carry out a combination of these modes on the same platform is an advance over many current technologies, which are limited to carrying out only a single operation. FIG. 3 shows the possibility of driving on-demand mixing of a small quantity of blue dye which was deposited with the same quantity into each of the 96 wells on the microarray plate that initially contained a pink-dyed solution. Prior to the excitation of the SRBW under select wells, each well contained the same amount of pink-dyed solution (100 μl) into which an equal amount of blue dye (1 μl) was placed. The ability for individual addressability can both be seen in FIG. 3(*a*), which shows the mixing to be arbitrarily actuated only in wells that were excited with the SRBW, whereas FIGS. 3(*b*) and 3(*c*) shows the possibility of sequentially addressing these individual wells. That negligible mixing is apparent in unexcited wells adjacent to those that were excited suggests minimal crosstalk of the acoustic wave between neighbouring devices as well as crosstalk of the vibrational signal between neighbouring wells—a problem which besets the setup shown in FIGS. 1(*a*) and 2(*a*) where the piezoelectric substrate spans neighbouring wells or even many wells. FIG. 3(*c*) shows where the acoustic excitation beneath wells 1, 2 and 3 were triggered at 0, 3 and 6 s, respectively, as shown by the vertical dashed lines. In FIG. 3(*c*), a value of 1 denotes the completely unmixed state and a value of 0 denotes a completely mixed state. The scale bars represent a length of 10 mm.

Figure 4:
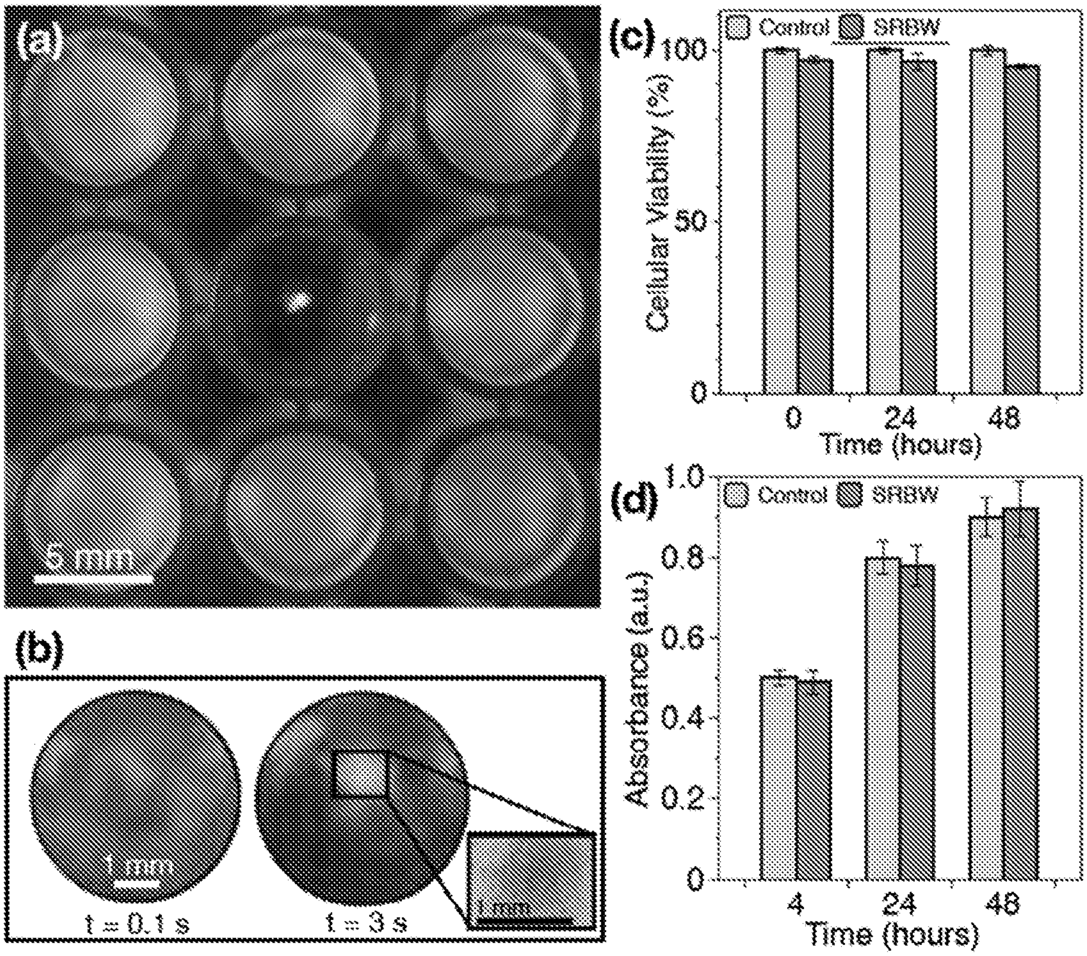
FIGS. 4(*a*) to (*d*) are respectively photographic images and graphs showing the rapid concentration of a suspension of particles and cells within a well of a microarray plate using an apparatus according to the present invention.

FIG. 4, on the other hand, shows the possibility for inducing microcentrifugation and hence particle/cell concentration in individual wells on demand. It can be seen from FIG. 4(*a*), which shows a top view image showing the rapid concentration of a suspension of 11 μm fluorescently-labelled particles, that the suspension of polystyrene particles housed in the central well is rapidly aggregated into a tight cluster within 5 s upon excitation of the SRBW beneath that well. The mechanism by which the azimuthal microcentrifugation flow arises, which, in turn, drives the particles to concentrate has been previously described in the Applicant's U.S. Pat. No. 8,998,483. That the liquid in all of the neighbouring wells, which contained the exact same suspension and which were not excited, remained quiescent and that the particles remained dispersed, again testifies to the ability for on-demand single-well addressability without crosstalk with neighbouring wells. The ability of the present invention to rapidly drive the clustering of cells, which has been shown to be a pre-cursor step for spheroid formation, within a specified well is shown in the image of FIG. 4(*b*). That image shows the rapid concentration of HeLa cells in a select well on a 96-well plate with the present invention within 4 s and 3 s, respectively. It was verified that the cells remained unaffected by the exposure to the acoustic excitation, as can be seen from the results of the short and long term cell viability and proliferation tests in FIGS. 4(*c*) and 4(*d*), respectively. FIG. 4(*c*) shows viability, as measured using a trypan blue assay, and, FIG. 4(*d*) proliferation, as measured using a MTT assay, of the HeLa cells, immediately and after 24 and 48 hours following their concentration under the acoustic excitation in the central well compared to cells in the neighbouring well which were not acoustically excited. In FIG. 4(*d*), the proliferation of the cells is quantified by the absorbance at 540 nm of dissolved formazan crystals converted from the MTT reagent by actively proliferating cells.

Figure 5:
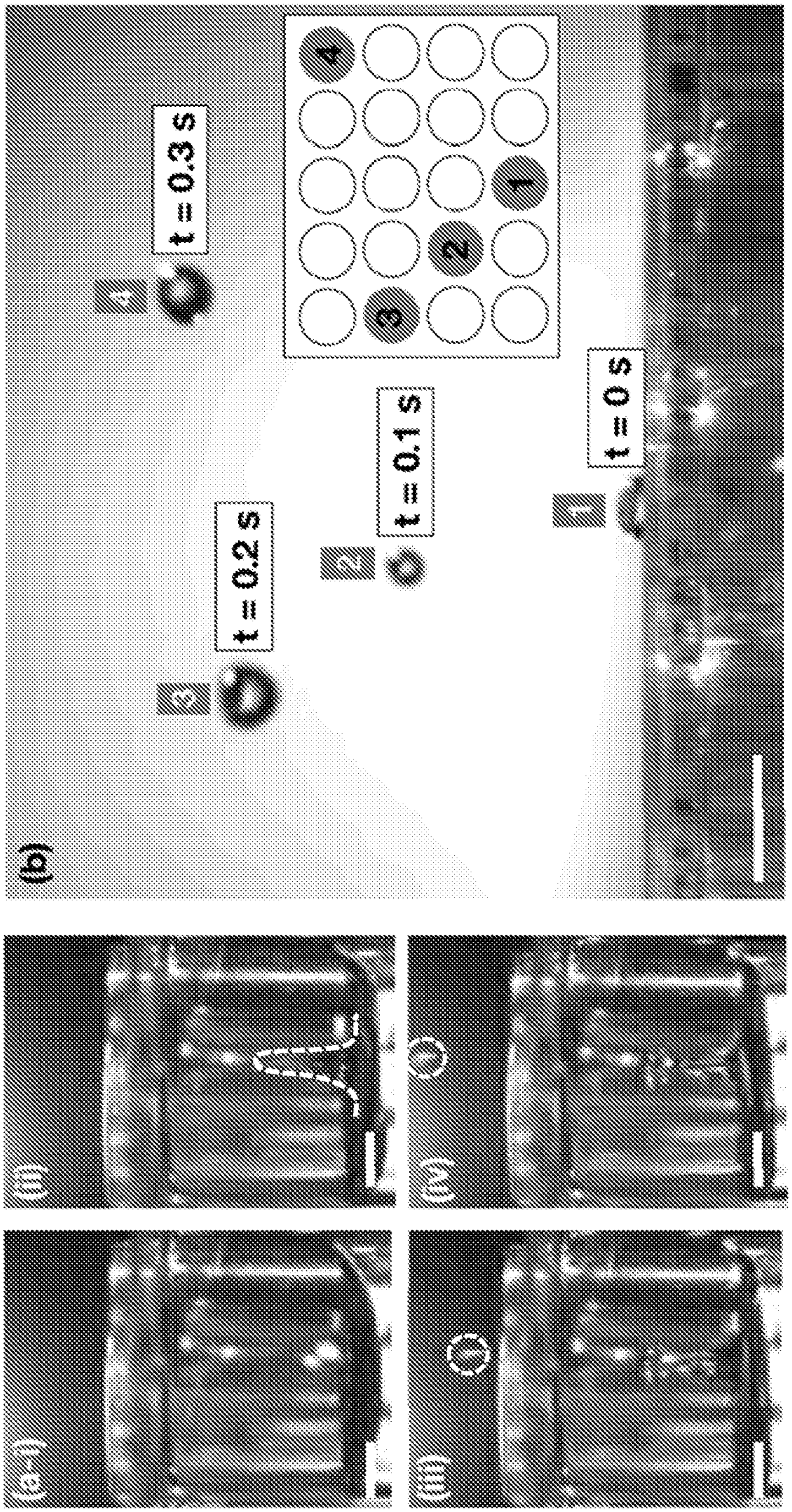
FIGS. 5(*a*) and (*b*) are respectively photographic images showing the formation of a liquid jet in a well of a microarray plate using the apparatus according to the present invention.

The possibility of extracting a small volume of liquid from individual wells at will is shown in FIG. 5, this ability for external sample transfer being useful for sampling individual wells for further separation or analysis. FIG. 5(*a*) shows the formation, elongation and subsequent pinch-off of a liquid jet within a well when subjected to an acoustic wave pulse from beneath to form a single droplet, which, in turn, is ejected from the well. Successive droplet ejection from different select wells can also be effected by sequentially triggering SRBW pulses under each well, as shown in FIG. 5(*b*). Sequential single droplet ejection from the different select wells is shown in the inset by successively triggering a SRBW pulse under each well at 0.1 s intervals. Each ejected droplet consisted of approximately the same volume (700±50 nl). The scale bars denote lengths of approximately 2 mm. Given the modular setup, the flexibility to simultaneously drive these events from multiple wells or sequentially from the same well can also be easily envisaged, which constitutes a far more attractive alternative compared to the slow and complex process of mechanically moving a single ultrasonic transducer to actuate different wells in the LabCyte Echo system.

Figure 6:
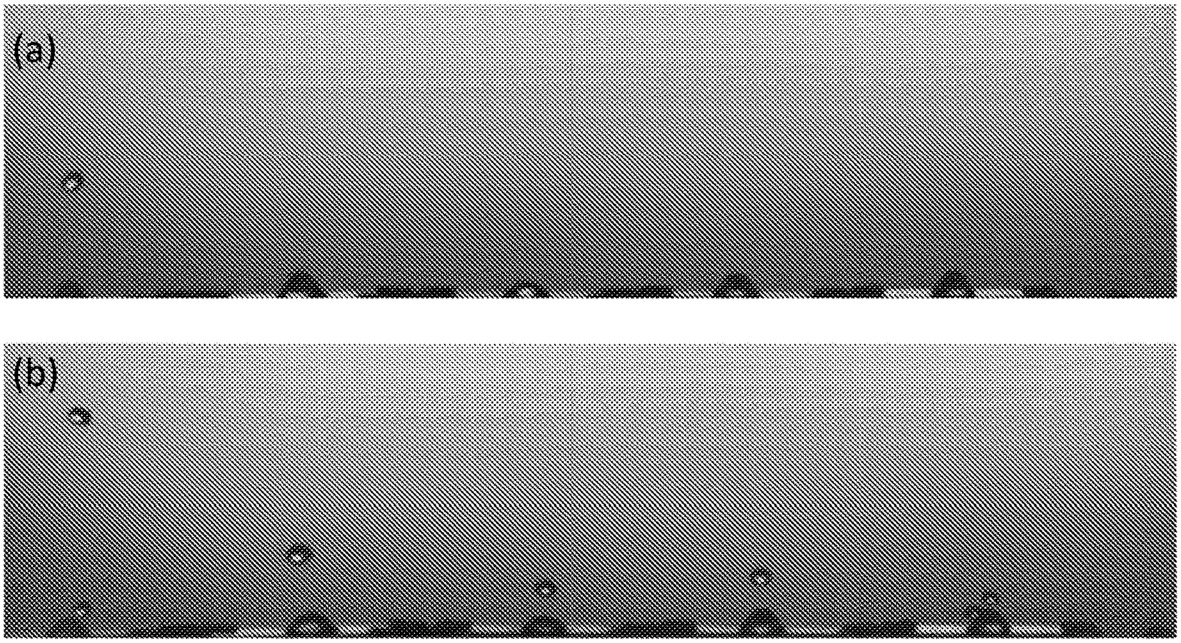
FIG. 6(*a*) demonstrates droplet ejection from one piezoelectric chip, while in (b) multiple droplet ejection from multiple piezoelectric chips. The timing of each droplet generation can be programmed individually and independently.
Figure 7:
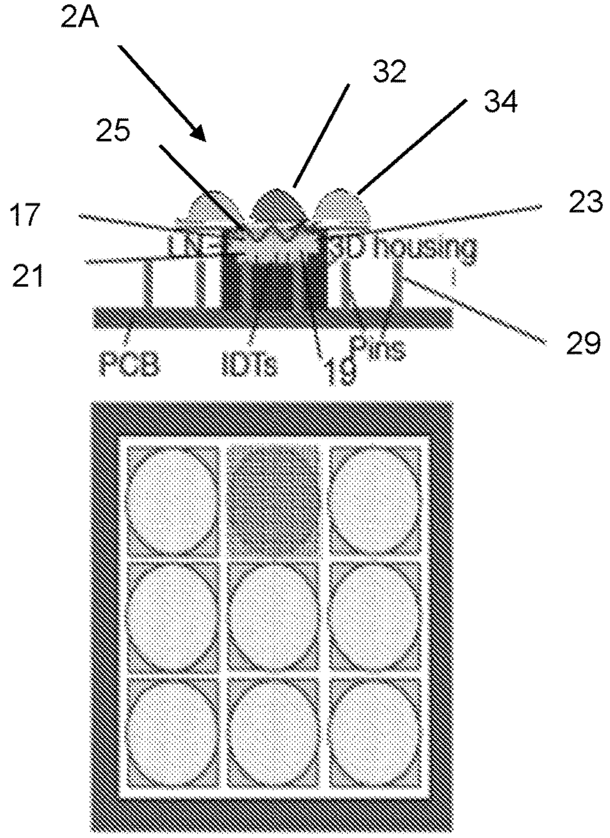
FIG. 7 respectively shows schematic side and top views of an apparatus according to the present invention which enables individual droplets to be addressed in the absence of cross-talk.

In still other embodiments, as shown in FIGS. 6 and 7, droplets may be placed directly onto a piezoelectric chip, in the absence of any fluid receptacle, allowing direct interaction between the acoustic waves and the droplets. An array of piezoelectric chips may be configured in any format (i.e. one or two dimensional array) and droplets can be placed onto the chips using pipette(s), pump(s), wicking conduit(s) or directly contacting the surface of the chip with another plate containing droplets. It is envisaged that embodiments without a receptacle may be utilised with emerging technology, such as DNA microarray (also referred to a DNA chip); that is, a collection of DNA spots on a solid surface. It is further envisaged that such an embodiment may be used with a droplet volume in the nanolitre scale ($10^{-9}$ litres), preferably a droplet volume in the picolitre scale ($10^{-12}$ litres). The capability for on-demand addressability of individual droplets to carry out a number of typical liquid handling processes required in, for example, DNA workflow, such as sequential mixing and single droplet ejection from single or multiple droplets via liquid jetting, represents a substantial advance over existing technology.

FIG. 7 shows an apparatus 2A according to the present invention for addressing droplets 32, 34 on the working surface. Like apparatus 2, apparatus 2A includes a plurality of piezoelectric chips 17, respectively dimensioned to address a single droplet 32 on the working surface 23. Each chip 17 has a bottom transducer surface 19 upon which is applied an IDT 21, and an opposing top working surface 23. The transducer surface 19 is at least substantially parallel to the working surface 23. The piezoelectric chips 17 are supported on a printed circuit board PCB) 22 vic pins 29 which supports the chip modules 17 in a grid pattern matching the positions of the droplets 32 or 34. The PCB 22 includes a conductive circuit layout for enabling an electrical signal to be applied to each IDT 21. The droplets 32 or 34 are in direct contact with the top working surfaces 23 of each chip 17.

For example, in the absence of a fluid receptacle, single or multiple droplets may be ejected from the piezoelectric chip array, where there is no acoustic cross-talk (i.e. interference) since each chip is fed with an independent electric wave and each chip is mechanically isolated from the neighbouring ones with a 3D printed case. The 3D printed casing may also provide the structure for which the electrical pins protrude from the printed circuit board (PCB) to contact piezoelectric chips. The independent electrical signals can therefore be programmed in any configuration to locally address each chip to jet, eject droplet or nebulise them. This represents a distinct advantage over existing technologies wherein an entire row of droplets or wells must be actuated or alternatively a single PZT is placed under a target well/droplet and then mechanically moved to a subsequent well/droplets. Instead, the present invention provides a solid-state format which can achieve precise, accurate single drop addressability without interference and furthermore without the need for a mechanically manipulated/moving PZT.

In summary, a versatile modular plug—and—actuate concept has been demonstrated that is truly compatible with the ubiquitous microarray titre plate and emerging technologies such as DNA microarrays on a picomolar scale. The present invention is capable of efficiently driving a range of microfluidic actuation processes from mixing, sample preconcentration and external liquid transfer—all of which comprise critical steps in the drug discovery workflow—on demand, with the possibility of addressing individual, multiple or all wells/droplets on the plate sequentially or simultaneously, thus constituting a significant step towards improving the functionality associated with existing laboratory protocols and processes.

The present invention therefore provides for true sequential or simultaneous single- and multi-well or droplet addressability in a microarray plate using a reconfigurable modular platform from which MHz-order hybrid surface acoustic waves and surface reflected bulk waves can be coupled to drive a variety of microfluidic modes including mixing, sample pre-concentration and droplet jetting/ejection in individual or multiple wells/droplets on demand, thus constituting a highly versatile yet simple setup capable of improving the functionality of existing laboratory protocols and processes.

The apparatus and method according to the present invention has a number of benefits:

a) contamination is minimised and reduced when compared to conventional liquid handling technologies such as robotically actuating micro-pipetting;
b) while robotically actuating micro-pipetting have volume limitations, this is not an issue for the present invention;
c) robotically actuating micro-pipetting is prone to mechanical failure, which is also not an issue for the present invention;
d) the LabCyte (liquid handling system) device is limited to one drop at a time and only to liquid dispensing not to other sample manipulations such as mixing and/or pre-concentration;
e) conventional SAW devices cannot target individual cells easily. The only way to target individual cells is to include a chip for each cell, however, this is too expensive and too much space on the substrate would be required to house all the individual chips; and
f) this technology can be retrofitted to existing devices.

The present invention provides a solid-state solution to fluid actuation within multiple wells/droplets, unlike other technologies that would require the transducers to slide beneath fluid wells to target them individually.

Although the present invention has been described with reference to preferred embodiments, workers skilled in the art will recognize that changes may be made in form and detail without departing from the spirit and scope of the invention. For example, modifications and variations as would be deemed obvious to the person skilled in the art are included within the ambit of the present invention as claimed in the appended claims

The invention claimed is:

1. An apparatus, including: a plurality of piezoelectric chips, each chip having a working surface, and an opposing transducer surface at least substantially parallel to the working surface; and at least one interdigital transducer applied to the transducer surface of each chip for generating acoustic energy within each chip and thereby activate that chip in response to an application of an electrical signal to the interdigital transducer; wherein the working surface of each chip is, when in use, in direct or indirect contact with a fluid receptacle to thereby respectively acoustically actuate fluid accommodated within said fluid receptacle, each chip being directly in contact with the receptacle or in contact with a fluid coupling medium that is in contact with the receptacle, further wherein the apparatus is configured to enable a user to selectively activate one or more chips from among the plurality of piezoelectric chips, by selectively applying an electrical signal to the at least one interdigital transducer of each of the chips to be selectively activated, to jet, eject droplet or nebulise said fluid accommodated within said fluid receptacle.

2. The apparatus according to claim 1, wherein said fluid receptacle comprises a microarray plate including a plurality of wells for respectively accommodating fluid therein.

3. The apparatus according to claim 2, wherein each chip of the plurality of piezoelectric chips is dimensioned to facilitate acoustic actuation and/or transfer of fluid within a single said well.

4. The apparatus according to claim 3, wherein the chips are located in a grid and/or arbitrary pattern to match the position of individual said wells of the microarray plate.

5. The apparatus according to claim 1, wherein at least one of the chips is supported on a printed circuit board having a conductive circuit layout for providing said electrical signal to the interdigital transducer of the at least one chip.

6. The apparatus according to claim 1, wherein the generated acoustic energy includes surface reflected bulk waves (SRBW).

7. The apparatus according to claim 6, wherein the acoustic energy includes surface acoustic waves (SAW).

8. The apparatus according to claim 6, wherein the acoustic energy includes bulk acoustic waves.

9. The apparatus according to claim 1, wherein the generated acoustic energy includes hybrid surface acoustic waves and surface reflected bulk waves (SRBW).

10. The apparatus according to claim 1, wherein the acoustic actuation of the fluid is selected from at least one member of the group consisting of manipulation, vibration, mixing, pre-concentration, jetting, nebulisation, particle/cell patterning, centrifugation, fluid or particle or cell transport, drop transport, streaming, and atomisation.

11. The apparatus according to claim 1, wherein a thickness of the chip and a wavelength of the generated acoustic energy are determined by a width and gap of the interdigital transducer patterns.

12. A method of acoustically actuating fluid accommodated within one or more wells of a microarray plate including:

providing a plurality of piezoelectric chips, each chip having a working surface, and an opposing at least substantially parallel transducer surface; and providing at least one interdigital transducer applied to the transducer surface of each chip, the at least one interdigital transducer configured to activate the chip by generating acoustic energy within the chip in response to an application of an electrical signal to the interdigital transducer;

wherein the working surface of each chip is, in use, in contact with said microarray plate, further wherein the method comprises selectively activating at least one, but not all, of the plurality of chips by selectively applying an electrical signal to the at least one interdigital transducer of the at least one chip.

13. The method according to claim 12, wherein each chip is dimensioned to facilitate acoustic actuation of fluid within a single said well.

14. The method according to claim 12, and further comprising locating the chips in a grid pattern to match the position of the wells in the microarray plate.

15. The method according to claim 12, and further comprising supporting each chip on a circuit board having a conductive circuit layout for providing said electrical signal to the interdigital transducer of each chip.

16. The method according to claim 12, wherein the generated acoustic energy includes surface reflected bulk waves (SRBW).

17. The method according to claim 16, wherein the acoustic energy includes surface acoustic waves.

18. The method according to claim 16, wherein the acoustic energy includes bulk acoustic waves.

19. The method according to claim 12, wherein the acoustic actuation of the fluid is selected from at least one member of the group consisting of manipulation, vibration, mixing, pre-concentration, jetting, nebulisation, particle/cell patterning, centrifugation, fluid or particle or cell transport, drop transport, streaming, and atomisation.

20. The apparatus according to claim 1, wherein each chip is in contact with the fluid coupling medium that is in contact with the receptacle, wherein the fluid coupling medium is an acoustic fluid, gel, or tape couplant.

21. An apparatus, including: a plurality of piezoelectric chips, each chip having a working surface, and an opposing transducer surface at least substantially parallel to the working surface; and at least one interdigital transducer applied to the transducer surface of each chip for generating acoustic energy within the chip and thereby activate the chip in response to an application of an electrical signal to the interdigital transducer; wherein the working surface of each chip is, when in use, in direct contact with a fluid droplet to be acoustically actuated, further wherein the apparatus is configured to enable a user to selectively activate one or more chips from among the plurality of piezoelectric chips, by selectively applying an electrical signal to the at least one interdigital transducer of each of the chips to be selectively activated, to jet, eject droplet or nebulise said fluid accommodated within said fluid receptacle.

22. The apparatus according to claim 21, wherein the chips are dimensioned to facilitate acoustic actuation and/or transfer of fluid onto the working surface of each chip.

23. The apparatus according to claim 22, wherein the chips are located in a grid.

24. The apparatus according to claim 21 wherein each chip is supported on a printed circuit board having a conductive circuit layout for providing said electrical signal to the interdigital transducer of each chip.

25. The apparatus according to claim 21, wherein the generated acoustic energy includes surface reflected bulk waves (SRBW).

26. The apparatus according to claim 25, wherein the acoustic energy includes surface acoustic waves (SAW).

27. The apparatus according to claim 25, wherein the acoustic energy includes bulk acoustic waves.

28. The apparatus according to claim 21 wherein the generated acoustic energy includes hybrid surface acoustic waves and surface reflected bulk waves (SRBW).

29. The apparatus according to claim 21, wherein the acoustic actuation of the fluid is selected from at least one member of the group consisting of manipulation, vibration, mixing, pre-concentration, jetting, nebulisation, particle/cell patterning, centrifugation, fluid or particle or cell transport, drop transport, streaming, and atomisation.

30. The apparatus according to claim 21, wherein a thickness of the chip and a wavelength of the generated acoustic energy are determined by a width and gap of the interdigital transducer patterns.

* * * * *